US 11,435,648 B2

(12) United States Patent
Sato

(10) Patent No.: US 11,435,648 B2
(45) Date of Patent: Sep. 6, 2022

(54) IMAGE CAPTURE APPARATUS AND CONTROL METHOD

(71) Applicant: CANON KABUSHIKI KAISHA, Tokyo (JP)

(72) Inventor: Noriaki Sato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/206,650

(22) Filed: Mar. 19, 2021

(65) Prior Publication Data
US 2021/0302804 A1 Sep. 30, 2021

(30) Foreign Application Priority Data

Mar. 24, 2020 (JP) .............................. JP2020-053139

(51) Int. Cl.
G03B 13/04 (2021.01)
H04N 5/232 (2006.01)
G06F 3/01 (2006.01)

(52) U.S. Cl.
CPC ............ G03B 13/04 (2013.01); G06F 3/013 (2013.01); H04N 5/23218 (2018.08); H04N 5/23299 (2018.08); H04N 5/232933 (2018.08); G03B 2213/025 (2013.01)

(58) Field of Classification Search
CPC .................................................... G03B 13/04
See application file for complete search history.

(56) References Cited

U.S. PATENT DOCUMENTS

2019/0014246 A1* 1/2019 Furukawa ............... G06F 1/169

FOREIGN PATENT DOCUMENTS

| JP | 2012-089973 A | 5/2012 |
| JP | 2012-189883 A | 10/2012 |
| JP | 2012-248913 A | 12/2012 |
| JP | 2019-016299 A | 1/2019 |

* cited by examiner

Primary Examiner — Minh Q Phan
(74) Attorney, Agent, or Firm — Cowan, Liebowitz & Latman, P.C.

(57) ABSTRACT

An image capture apparatus detects an eye approaching to a finder, switches between a locked state in which execution of a function corresponding to an operation on a touch panel having a display surface of a display unit capable of displaying a captured image as an operation surface is restricted and an unlocked state in which the execution of the function is not restricted, and performs control such that in the locked state, even if a specific operation is performed on the touch panel without detecting the eye approaching, predetermined processing corresponding to the specific operation is not executed, and the predetermined processing is executed in response to the specific operation on the touch panel being performed in a state where a predetermined condition including detection of the eye approaching is satisfied.

18 Claims, 6 Drawing Sheets

FIG. 4

| | TAP | TOUCH-MOVE |
|---|---|---|
| Av | INVALID | INVALID |
| Tv | INVALID | INVALID |
| ISO | INVALID | INVALID |
| EXPOSURE CORRECTION | INVALID | INVALID |
| WB | INVALID | VALID |
| PHOTOMETRIC METHOD | INVALID | VALID |
| AF METHOD | INVALID | VALID |
| AF OPERATION | INVALID | VALID |
| AF/MF | INVALID | VALID |
| AF POSITION | VALID | VALID |

IMAGE CAPTURE APPARATUS AND CONTROL METHOD

BACKGROUND OF IRE INVENTION

Field of the Invention

The present invention relates to a technique for preventing an erroneous operation on a device.

Description of the Related Art

In devices in which various operation members are provided, there are devices equipped with a lock lever or a lock button for switching whether to lock or unlock the operation member for preventing an erroneous operation. It is disclosed in Japanese Patent Laid-Open No. 2012-189883 that the operation member is locked by the lock lever, and when the operation member, which is locked, is operated, it is warned to the user that the operation member subjected to be operated has been locked. Such an alert allows the user to intuitively recognize that the operation performed by the user is invalid. Japanese Patent Application Laid-Open No. 2012-089973 discloses a technique (touch pad operation) of designating an AF position in accordance with a touch operation on a touch panel provided separately from a tinder while looking into the finder.

As disclosed in Japanese Patent Application Laid-Open No. 2012-189883, if the operation on the operation member is in a locked state for the purpose of preventing an erroneous operation, even an intentional operation in a scene in which the user is performing shooting in a state in which the user's eye is contacting with the finder and an erroneous operation is less likely to be performed is invalidated. For example, when the touch operation on the touch panel is locked, the touch pad operation in Japanese Patent Application Laid-Open No. 2012-089973 cannot be performed. When the locked operation member is intended to be operated at a time of an eye approaching, an operation of releasing the lock is required each time.

SUMMARY OF THE INVENTION

The present invention has been made in consideration of the aforementioned problems, and realizes techniques for reducing the trouble of the operation when setting and releasing the locks, and achieving both prevention of erroneous operation and good operability.

In order to solve the aforementioned problems, the present invention provides an image capture apparatus comprising: an eye approach detection unit configured to detect an eye approaching to a finder; a switching unit configured to switch between a locked state in which execution of a function corresponding to an operation on a touch panel having a display surface of a display unit capable of displaying a captured image as an operation surface is restricted and an unlocked state in which the execution of the function is not restricted; and a control unit configured to perform control such that in the locked state, even if a specific operation is performed on the touch panel without detecting the eye approaching by the eye approach detection unit, predetermined processing corresponding to the specific operation is not executed, and the predetermined processing is executed in response to the specific operation on the touch panel being performed in a state where a predetermined condition including detection of the eye approaching by the eye approach detection unit is satisfied.

In order to solve the aforementioned problems, the present invention provides a method of controlling an image capture apparatus having an eye approach detection unit configured to detect an eye approaching to a finder, and a switching unit configured to switch between a locked state in which execution of a function corresponding to an operation on a touch panel having a display surface of a display unit capable of displaying a captured image as an operation surface is restricted and an unlocked state in which the execution of the function is not restricted, the method comprising: controlling such that, in the locked state, even if a specific operation is performed on the touch panel without detecting the eye approaching by the eye approach detection unit, predetermined processing corresponding to the specific operation is not executed, and the predetermined processing is executed in response to the specific operation on the touch panel being performed in a state where a predetermined condition including detection of the eye approaching by the eye approach detection unit is satisfied.

In order to solve the aforementioned problems, the present invention provides a non-transitory computer-readable storage medium storing a program for causing a computer to function as each unit of an image capture apparatus comprising: an eye approach detection unit configured to detect an eye approaching to a finder; a switching unit configured to switch between a locked state in which execution of a function corresponding to an operation on a touch panel having a display surface of a display unit capable of displaying a captured image as an operation surface is restricted and an unlocked state in which the execution of the function is not restricted; and a control unit configured to perform control such that in the locked state, even if a specific operation is performed on the touch panel without detecting the eye approaching by the eye approach detection unit, predetermined processing corresponding to the specific operation is not executed, and the predetermined processing is executed in response to the specific operation on the touch panel being performed in a state where a predetermined condition including detection of the eye approaching by the eye approach detection unit is satisfied.

In order to solve the aforementioned problems, the present invention provides a non-transitory computer-readable storage medium storing a program for causing a computer to execute a method of controlling an image capture apparatus having an eye approach detection unit configured to detect an eye approaching to a finder, and a switching unit configured to switch between a locked state in which execution of a function corresponding to an operation on a touch panel having a display surface of a display unit capable of displaying a captured image as an operation surface is restricted and an unlocked state in which the execution of the function is not restricted, the method comprising: controlling such that, in the locked state, even if a specific operation is performed on the touch panel without detecting the eye approaching by the eye approach detection unit, predetermined processing corresponding to the specific operation is not executed, and the predetermined processing is executed in response to the specific operation on the touch panel being performed in a state where a predetermined condition including detection of the eye approaching by the eye approach detection unit is satisfied.

According to the present invention, it is possible to reduce the trouble of the operation when setting and releasing the lock, and to achieve both prevention of erroneous operation and good operability.

Further features of the present invention will become apparent from the following description of exemplary embodiments (with reference to the attached drawings).

BRIEF DESCRIPTION OF THE DRAWINGS

FIG. 4 is a diagram exemplifying setting items that are enabled or disabled to change settings by a touch operation in the eye approaching state according to the present embodiment.

DESCRIPTION OF THE EMBODIMENTS

Figure 1A:
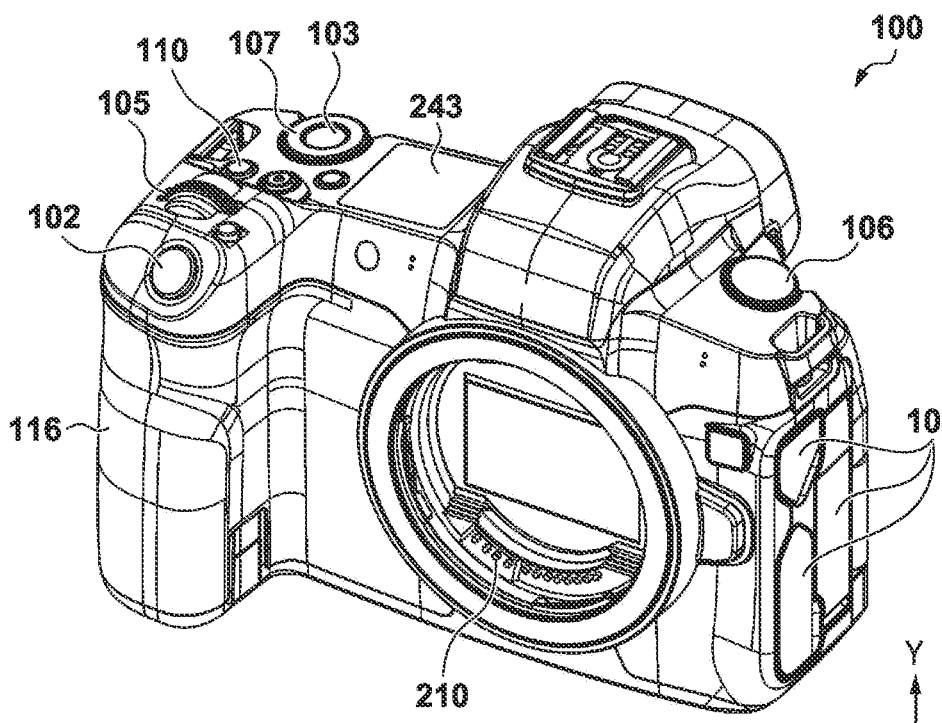
FIGS. 1A and 1B are external views of a digital camera of a present embodiment.

An exemplary embodiment of the present invention will be described in detail below with reference to the accompanying drawings. It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment. Multiple features are described in the embodiments, but limitation is not made an invention that requires all such features, and multiples of such features may be combined as appropriate. Furthermore, in the attached drawings, the same reference numerals are given to the same or similar configurations, and redundant description thereof is omitted.

First Embodiment

Hereinafter, embodiments in which an image capture apparatus of the present invention is applied to a single-lens reflex digital camera capable of shooting a still image and/or a moving image will be described in detail with reference to the accompanying drawings.

<Apparatus Configuration>

Figure 1B:
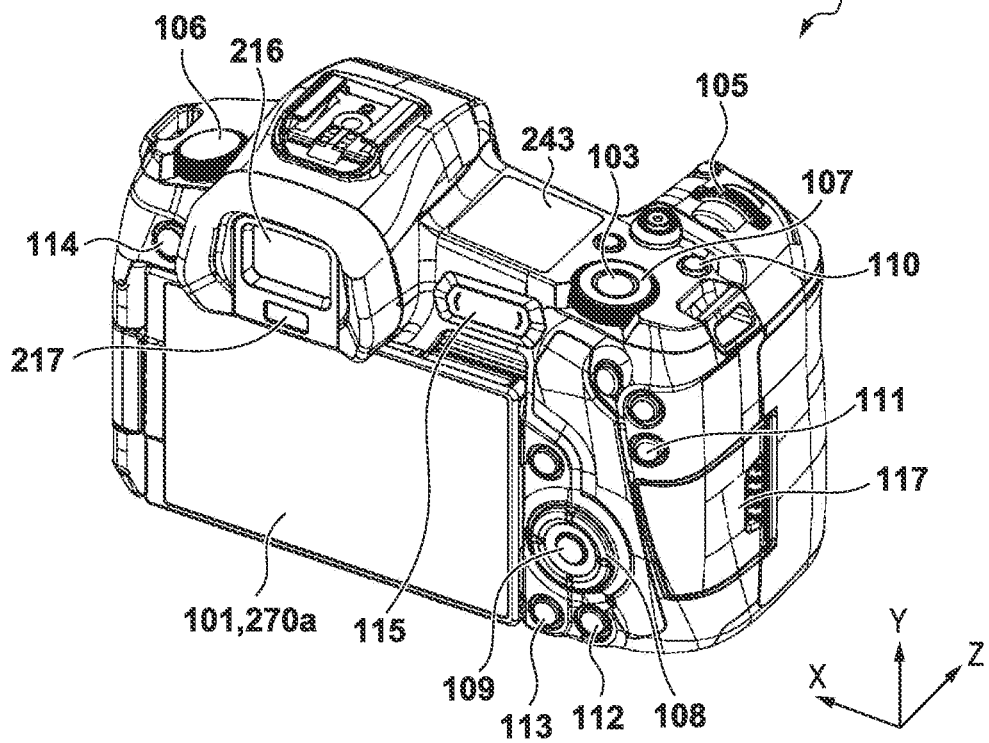
Figure 2:
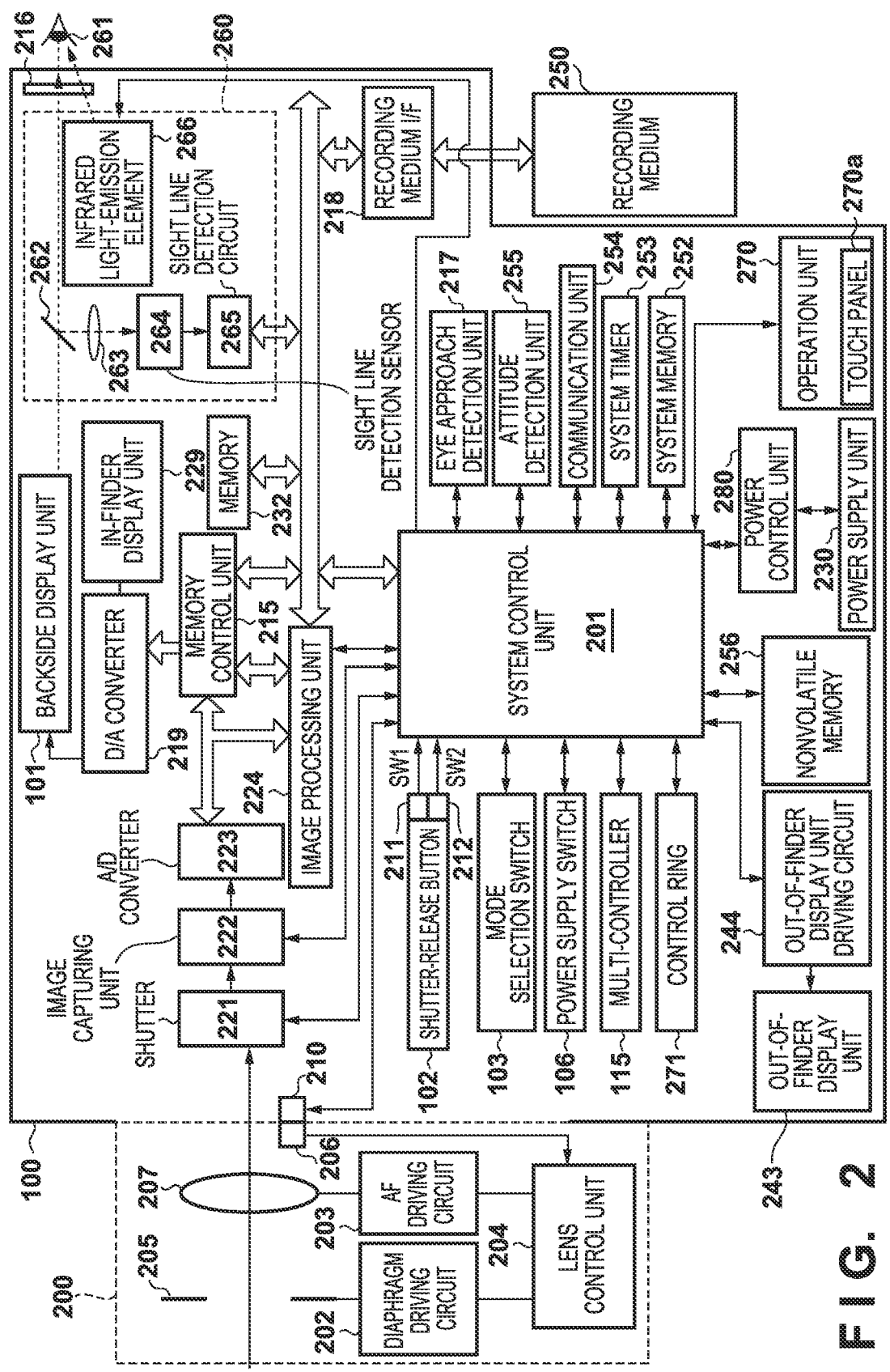
FIG. 2 is a block diagram illustrating a configuration of the digital camera of the present embodiment.

With reference to FIGS. 1A, 1B and 2, the configuration and functions of the digital camera 100 according to the present embodiment will be described.

FIG. 1A is a front perspective view of the digital camera 100 in a state where a lens unit 200 is detached. FIG. 1B is a back perspective view of the digital camera 100.

In FIGS. 1A and 1B, a backside display unit 101 is an out-of-finder display unit for displaying images and various types of information and a display device such as an LCD provided on the back surface of the camera body. Moreover, the backside display unit 101 has a function of reproducing a still image after the still image was shot, a function of displaying a moving image that is being recorded, and a live view display (through-the-lens display) function as well. A touch panel (touch screen) 270a is provided on the backside display unit 101. The touch panel 270a is a touch operation member capable of detecting contact (touch operation) with the display surface (touch operation surface of the touch panel 270a) of the backside display unit 101.

An out-of-finder display unit 243 is a display device provided on the upper surface of the camera body, and displays various setting values of the camera such as a shutter speed and a diaphragm aperture. A shutter-release button 102 is an operation member for giving a shooting instruction. A mode selection switch 103 is a rotating dial type operation member for switching between various modes. A terminal cover 104 is a cover member for protecting a connector (not illustrated) for connecting an external device and the digital camera 100 via a cable such as a USB cable. A main electronic dial 105 is a rotating operation member included in operation units 270 that will be described later with reference to FIG. 2, and by rotating this main electronic dial 105, setting values such as a shutter speed and a diaphragm aperture can be changed.

A power supply switch 106 is an operation member for switching between on/off of the power supply to the digital camera 100. A sub electronic dial 107 is a rotating operation member included in the operation units 270 that will be described later with reference to FIG. 2, and can move a selected frame, scroll images, and/or the like. A cross key 108 is also a movement instruction member included in the operation units 270 that will be described later with reference to FIG. 2, and is a four-directional operation button having push buttons that can be pressed in four directions of up, down, left, and right. The operation can be performed according to the portion of the cross key 108 pressed in the pressed direction. A SET button 109 is also a push button included in the operation units 270 that will be described later with reference to FIG. 2, and is mainly used for determining a selection item and/or the like.

A lock button 110 is also a push button included in the operation units 270 that will be described later with reference to FIG. 2, and in response to the button being pressed, it is possible to switch between setting/releasing of a locked state in which an operation on an operation member to be subjected to be locked such as the main electronic dial 105, the sub electronic dial 107, the touch panel 270a, the multi controller 115, and or a control ring (not shown) is validated/invalidated. That is, each time the lock button 110 is pressed, the locked state is switched to the unlocked state (lock released state) if the locked state is set before the lock button 110 is pressed, and the unlocked state is switched to the locked state if the unlocked state is set before the lock button 110 is pressed. The operation member subjected to be locked (hereinafter referred to "locking target operation member") which is capable of setting/releasing the locked state by the lock button 110 is an operation member that may be operated unintentionally by the user, and then is assumed to be deteriorated in operability if a value set in advance by the user is unintentionally changed. In the present embodiment, in order to prevent setting change due to an erroneous operation unintended by the user, the locked state of the locking target operation member can be set/released. In the present embodiment, the main electronic dial 105, the sub electronic dial 107, the touch panel 270a, the multi-controller 115, and the control ring (not shown) are exemplified as the operation members that can be selected as the locking target operation members. Further, the user may arbitrarily set the locking target operation member on a menu screen, or the like.

The control ring is an operation member capable of a rotation operation centered on an optical axis around a lens barrel of the lens unit 200 that will be described later in FIG. 2. When operating the control ring, an electrical pulse signal corresponding to the rotation amount (manipulated variable) is generated, the system control unit 201 controls each component of the digital camera 100 based on the pulse signal. When the function selection button of the control ring is pressed, a menu screen in which the function assigned to the control ring can be changed is displayed on the backside display unit 101. The control ring is used to select setting items and change values.

An enlargement/reduction button 111 is also a push button included in the operation units 270 that will be described later in FIG. 2, during a live view display in a shooting mode, and can turn on/off the enlargement mode, change the enlargement ratio in the enlargement mode, and reduce the image by decreasing the enlargement ratio of the enlarged image. The enlargement/reduction button 111 can enlarge/reduce a reproduced image and increase/decrease the enlargement ratio in a reproduction mode. The delete button 112 is also a push button included in the operation units 270 that will be described later with reference to FIG. 2, and can delete an image file recorded on a recording medium 250 in shooting processing described later. A reproduction button 113 is also an operation member included in the operation units 270 that will be described later in FIG. 2, and can switch the operation mode of the digital camera 100 to the shooting mode or the reproduction mode. A menu button 114 is also a push button included in the operation units 270 that will be described later with reference to FIG. 2, and can display a menu screen on the backside display unit 101. A multi-controller 115 is also included in the operation unit 270 that will be described later with reference to FIG. 2, and is an operation member, i.e., an operation bar, which can be slid in the lateral direction, and can assign various functions to the slide operation and the touch operation at both ends.

A grip portion 116 has a shape that makes it easy to be grasped by a user's a right hand when he or she holds the digital camera 100. The shutter-release button 102 and the main electronic dial 105 are arranged at positions where the grip portion 116 can be operated by the index finger of the right hand while holding the digital camera 100 by gripping the grip portion 116 with the little finger, the ring finger and the middle finger of the right hand. In the same state, the sub electronic dial 107 is arranged at a position operable with the thumb of the right hand. A lid 117 is a member for opening or closing a slot for mounting/removing the recording medium 250 to/from the digital camera 100.

A communication terminal 210 is an electric contact point for the digital camera 100 to perform communication with the lens unit 200. An eyepiece part 216 is a look-through type eyepiece finder. The user can visually recognize an image displayed on an electronic viewfinder (EVF) which is the in-finder display unit 229 through the eyepiece part 216, and can confirm the focus and composition of the captured object image through the lens unit 200 that will be described later in FIG. 2.

An eye approach detection unit 217 is arranged near the eyepiece part 216, and can detect approach of any object to the eyepiece part 216. As the eye approach detection unit 217, for example, an infrared proximity sensor is used.

Next, with reference to FIG. 2, the internal configuration of the digital camera 100 and the lens unit 200 of the present embodiment. In FIG. 2, components that are the same as those in FIGS. 1A and 1B are denoted by the same reference numerals.

In FIG. 2, the lens unit 200 is equipped with a shooting lens 207, and is detachable from the digital camera 100. The shooting lens 207 is usually constituted by a plurality of lenses, but is simplified here and is shown by one lens. A communication terminal 206 is an electric contact point for the lens unit 200 to perform communication with the digital camera 100. The communication terminal 210 is an electric contact point for the digital camera 100 to perform communication with the lens unit 200. The lens unit 200 performs communication with the system control unit 201 via the communication terminal 206, and a built-in lens control unit 204 controls a diaphragm driving circuit 202 so as to drive a diaphragm aperture 205, and controls an AF driving circuit 203 so as to displace the position of the shooting lens 207, thereby bringing the object image in focus.

A focal plane shutter 221 can freely control the exposure time of the image capturing unit 222 in accordance with an instruction from the system control unit 201. The image capturing unit 222 is an image sensor constituted by an imaging element such as a CCD or a CMOS for converting the object image into electrical signals. An A/D converter 223 converts an analog signal output from the image capturing unit 222 into a digital signal.

An image processing unit 224 performs resizing processing, such as predetermined pixel interpolation and reduction, and color conversion processing, with respect to data from the A/D converter 223 or data from a memory control unit 215. Further, the image processing unit 224 performs predetermined calculation processing using the captured image data, and the system control unit 201 performs exposure control and focus control based on the calculation results. Thus, AF (Automatic Focus) processing, AE (Automatic Exposure) processing, and EF (flash pre-emission) processing of TTL (Through the Lens) type are performed. Furthermore, the image processing unit 224 performs predetermined calculation processing using the captured image data, and AWB (Automatic White Balance) processing of TTL type is performed on the basis of the calculation results.

A memory control unit 215 controls to exchange data between the A/D converter 223, the image processing unit 224, and the memory 232. Digital data output from the A/D converter 223 is directly written into the memory 232 via both the image processing unit 224 and the memory control unit 215 or via the memory control unit 215. The memory 232 stores image data obtained from the image capturing unit 222 and the A/D converter 223, and display data for displaying the image on the backside display-unit 101 or the in-finder display unit 229. The memory 232 has a storage capacity that is sufficient for storing a predetermined number of still images as well as moving images and audio for a predetermined time period. The memory 232 also functions as a memory for image display (video memory).

A D/A converter 219 converts the display data for the image stored in the memory 232 into an analog signal and supplies the backside display unit 101 or the in-finder display unit 229 with the analog signal. The display data for the image that was written into the memory 232 is displayed by the backside display unit 101 or the in-finder display unit 229 via the D/A converter 219. The backside display unit 101 and the in-finder display unit 229 display the display data on the display device in accordance with the analog signal from the D/A converter 219. In this manner, the digital signals stored in the memory 232 are converted into analog signals, and the analog signals are successively transmitted to the backside display unit 101 or the in-finder display unit 229 so as to be displayed thereon, making it possible to function as an electronic view finder (EVF) and to perform live view (LV) display (through the lens image display).

Various setting values of the camera such as a shutter speed and a diaphragm aperture are displayed on the out-of-finder display unit 243 via an out-of-finder display unit driving circuit 244.

A nonvolatile memory 256 is an electrically erasable/recordable memory, and for example, a flash ROM or the like is used. In the nonvolatile memory 256, constants and programs, for example, for operating the system control unit 201 are stored. In this context. "programs" may refer to programs for executing flowcharts that will be described later.

The system control unit 201 is an arithmetic processing device comprising at least one processor or circuit, overall controlling the entire digital camera 100. The system control unit 201 realizes, by executing the programs stored in the nonvolatile memory 256, the procedures of the flowchart that will be described later. As the system memory 252, for example, RAM is used, and the system memory 252 is used also as a work memory where constants and variables for operating the system control unit 201 and the programs read out from the nonvolatile memory 256 are expanded. The system control unit 201 controls the memory 232, the D/A converter 219, the backside display unit 101, the in-finder display unit 229, and/or the like, so as to perform display control. A system timer 253 is a time measurement unit for measuring time periods for various types of controls and the time of an inner clock.

The mode selection switch 103, a first shutter switch 211, a second shutter switch 212, and the operation units 270 are operation devices for inputting various types of operating instructions to the system control unit 201. The mode selection switch 103 switches the operation mode of the system control unit 201 to any of a still image shooting mode, a moving image recording mode, and a reproduction mode. The still image shooting mode includes an automatic shooting mode, an automatic scene determination mode, a manual mode, aperture-priority mode (Av mode), shutter-priority AE mode (Tv mode), and program AE mode (P mode), for example. The still image shooting mode also includes various scene modes each for which scene-specific shooting setting is made, custom mode, and/or the like.

The user may directly switch to any of these shooting modes by operating the mode selection switch 103, or may switch to any of the shooting modes using another operation member after once being switched to a list screen of the operation modes with the mode selection switch 103 and selecting any of the plurality of shooting modes displayed in a list. Similarly, also the moving image recording mode and the reproduction mode may include a plurality of modes.

While the shutter-release button 102 provided on the digital camera 100 is being operated, that is, pressed halfway (the shooting preparation instruction), the first shutter switch 211 is tamed on and generates a first shutter switch signal SW1. Upon receiving the first shutter switch signal SW1, the system control unit 201 starts shooting preparation operations such as AF (auto focus) processing, AE (auto exposure) processing, AWB (auto white balance) processing, and EF (flash pre-emission) processing.

When the operation of the shutter-release button 102 is completed, that is, the shutter-release button 102 is pressed fully (the shooting instruction), the second shutter switch 212 is turned on and generates a second shutter switch signal SW2. Upon receiving the second shutter switch signal SW2, the system control unit 201 starts a series of shooting processing from reading out the signal from the image capturing unit 222 to writing of the captured image data as an image file to the recording medium 250.

The operation units 270 comprise operation members such as various switches and buttons for accepting various operations from a user and notifying the system control unit 201 of the accepted operations, and include at least the following operation members: the shutter-release button 102, the mode selection switch 103, the main electronic dial 105, the power supply switch 106, the sub electronic dial 107, the cross key 108, the SET button 109, the lock button 110, the enlargement/reduction button 111, the delete button 112, the reproduction button 113, the menu button 114, multi-controller 115 and the control ring 271.

A power control unit 280 is constituted by, for example, a battery detection circuit, a DC-DC converter, and a switch circuit for changing over the block to be supplied with power, and detects whether a battery has been inserted or not, the type of the battery, and the residual capacity thereof. Further, the power control unit 280 controls the DC-DC converter in accordance with the detection results and an instruction of the system control unit 201, and supplies a necessary voltage for a necessary length of time to each component including the recording medium 250.

A power supply unit 230 comprises a primary battery such as an alkaline battery or a lithium battery, a secondary battery such as a NiCd battery, a NiMH battery, or a Li-ion battery, and an AC adaptor. A recording medium interface (I/F) 218 is for interfacing with the recording medium 250 such as a memory card or a hard disk drive. The recording medium 250 is a recording medium such as a memory card for recording shot images, and is constituted by a semiconductor memory, a magnetic disk, or the like.

A communication unit 254 communicably connects an external device by a wireless antenna or a cable, and transmits and receives a video signal, an audio signal, and/or the like. The communication unit 254 can also connect to a wireless LAN (Local Area Network) and the Internet. The communication unit 254 can transmit image data (including a live view image) captured by the image capturing unit 222 and an image file recorded on the recording medium 250 to an external device, and can receive image data or other various information from the external device. Note that the communication unit 254 is not limited to a wireless LAN, but may use a wireless communication module such as an infrared communication, Bluetooth®, Bluetooth® Low Energy or Wireless USB, or a wired connection device such as a USB cable, HDMI®, IEEE 1394, or the like.

An attitude detection unit 255 detects the attitude (orientation) of the digital camera 100 with respect to the gravity direction. Based on the attitude detected by the attitude detection unit 255, it is possible to discriminate whether an image captured by the image capturing unit 222 has been shot by setting the digital camera 100 in the landscape or portrait direction. The system control unit 201 can add information about the orientation information corresponding to the attitude detected by the attitude detection unit 255 to the image file, and rotate and record the captured image. An acceleration sensor, gyro sensor or the like may be used as the attitude detection unit 255. The attitude detection unit 255 can also detect the movement (pan, tilt, lift, rest, etc.) of the digital camera 100 by using the acceleration sensor or the gyro sensor.

Included among the operation units 270 is also the touch panel 270a that is capable of detecting a touch operation on the backside display unit 101. The touch panel 270a and the backside display unit 101 can be constructed as a single integrated unit. For example, the touch panel 270a is constructed in such a manner that the transmittance of light will not interfere with the display presented by the backside display unit 101, and it is attached to the uppermost layer of the display face of the backside display unit 101. In addition, input coordinates on the touch panel 270a and display coordinates on the backside display unit 101 are correlated.

As a result, a GUI can be constructed so as to make it possible for the user to directly manipulate the screen displayed on the backside display unit 101. The system control unit 201 is capable of detecting the following touch operations and/or conditions performed by contacting the touch panel 270a.

Newly touching of the touch panel 270a by a finger or pen which has not been in contact with the touch panel 270a, that is, a start of the touch (referred to as "touch-down" below).

A state in which the touch panel 270a is in contact with a finger or pen (referred to as "touch-on" below).

Movement of a finger or pen while in contact with the touch panel 270a (referred to as "touch-move" below).

Releasing a finger or pen that has been in contact with the touch panel 270a, that is, an end of the touch (referred to as "touch-up" below).

A state in which the touch panel 270a is not being touched at all (referred to as "touch-off" below).

When touch-down is detected, the touch-on state is also detected at the same time. Unless touch-up is detected after touch-down, touch-on usually continues to be detected. Touch-move is also detected in a state where touch-on is being detected. Even if touch-on is being detected, touch-move is not detected unless the touch position moves. After touch-up of all the fingers or a pen that has been in contact is detected, the touch-off state is entered.

These operations/conditions and position coordinates at which the touch panel 270a is being touched by the finger or pen are communicated to the system control unit 201 through an internal bus and, based upon the information thus communicated, the system control unit 201 determines what kind of operation (touch operation) was performed on the touch panel 270a.

As for "touch-move", the determination can be made also fir every vertical component and horizontal component with regard to the direction of movement of the finger or pen, which is moved on the touch panel 270a, based upon a change in the coordinate position. Further, the system control unit 201 can determine that a slide operation (drag) has been performed if it detects a touch-move over a predetermined distance. An operation in which a finger is touched against the touch panel, swiftly moved a certain distance, and then lifted away will be referred to as a "flick". In other words, a flick is an operation in which a finger is swiftly flicked across the touch panel 270a. If a touch-move with a predetermined distance or higher and a predetermined speed or higher is detected, and then a touch-up is detected, it can be determined that a flick has been performed (it can be determined that a flick was performed in succession to a drag). Furthermore, a touch operation in which the touch panel is touched at multiple locations for example, two points) at the same time, and then the touch positions are moved closer to each other will be referred to as a "pinch-in", and a touch operation in which the touch positions are moved away from each other will be referred to as a "pinch-out". Pinch-out and pinch-in operations will be collectively referred to as "pinch operations" (or simply "pinching").

The touch panel 270a may employ a method that relies upon any of the following: resistive film, electrostatic capacitance, surface acoustic waves, infrared radiation, electromagnetic induction, image recognition and optical sensing. There are methods in which a touch is detected based on contact with the touch panel, as well as methods in which a touch is detected based on approach of a finger or a pen to the touch panel, and any method may be employed.

The digital camera 100 of the present embodiment has a touch and drag function that allows the user to move the AF frame or change parameters while looking through the finder. For example, in the touch and drag AF, by performing the tap or the touch-move on the touch panel 270a, it is possible to move the AF frame displayed on the in-finder display unit 229 to a desired position (a position of an object of a tracking target or an object of a focusing target). When the touch-move operation is performed in an eye approaching state, the user can set the method of designating the position indicator according to the touch-move operation to either an absolute position designation or a relative position designation. For example, if the position indicator is an AF frame, in the case of the absolute position designation, if there is the touch-down on the touch panel 270a, the AF position associated with the touched-down position (the position at which coordinates are input) is set regardless of the AF position (current AF position) set before the touch-down. That is, the position coordinates at which the touch operation is performed and the position coordinates of the backside display unit 101 are associated with each other. On the other hand, in the case of the relative position designation, the position coordinates in which the touch operation is performed and the position coordinates of the backside display unit 101 are not associated with each other. In the relative position designation, the AF position does not move at the time of touch-down. If there is the touch-move after the touch-down is performed, the AF position is moved in a movement direction of the touch-move from the AF position (current AF position) set before the touch is performed by only a distance corresponding to the movement amount of the touch-move, regardless of the touch-down position on the touch panel 270a.

The eye approach detection unit 217 detects whether an eye (an object) has approached or contacted (eye approaching), or has moved away (eye separation) from the eyepiece part 216 (approach detection). The system control unit 201 switches the backside display unit 101 and the in-finder display unit 229 between displaying (a display state)/not displaying (a non-display state) in accordance with the state detected by the eye approach detection unit 217. The system control unit 201 sets a display destination as the backside display unit 101 and sets the in-finder display unit 229 to be not displaying during non-eye approach detection at least in a case where the shooting mode and the switching of the display destination are automatic. Further, the system control unit 201 sets the display destination as the in-finder display unit 229 and sets the backside display unit 101 to be not displaying during eye approach detection.

If an object has approached, infrared light irradiated from a light emitting unit (not illustrated) of the eye approach detection unit 217 is reflected and is made to be incident on a light receiving unit (not illustrated) of the infrared proximity sensor. In accordance with an incident light amount of the infrared light received by the infrared proximity sensor, it is possible to detect an approach of some kind of physical object to the eyepiece part 216, and discriminate to what level of distance the object has gotten close to the eyepiece part 216 (an eye approaching distance). Upon detecting an approach of an object to the eyepiece part 216, the system control unit 201 can cause display of the in-finder display unit 229 to start. With this, it is possible for the in-finder display unit 229 to display without delay as much as possible when a user looks through the eyepiece part 216.

In addition, upon detecting that an object has approached within a predetermined distance with respect to the eyepiece part 216 from a non-eye approaching state (no approach state), the eye approach detection unit 217 determines that eye approaching is detected and transmits an eye approach detection notification to the system control unit 201. In addition, if an object for which an approach was detected is apart by the predetermined distance or more from an eye approaching state (approach state), the eye approach detection unit 217 determines that eye separation is detected, and an eye separation detection notification is transmitted to the system control unit 201. A threshold for detecting eye approaching and a threshold for detecting eye separation may be made different such as by providing hysteresis for example. In addition, it is assumed that, after eye approaching is detected, there is an eye approaching state until eye separation is detected. In addition, it is assumed that, after eye separation is detected, there is a non-eye approaching state until eye approaching is detected. With this, the system control unit 201 performs display control of the backside display unit 101 and the in-finder display unit 229 in response to an eye approaching state or an eye separation state detected by the eye approach detection unit 217.

Note that the eye approach detection unit 217 is not limited to an infrared proximity sensor, and another sensor may be used if it can detect an approach of an object or an eye to be deemed as eye approaching. In the present embodiment, the light projecting portion and the light receiving portion of the eye approach detection unit 217 are separate devices from an infrared light-emission element 266 and a sight line detection sensor 264 of a sight line detection unit 260 that will be described later, but the light projecting portion of the eye approach detection unit 217 may also serve as the infrared light-emission element 266 and the light receiving portion as the sight line detection sensor 264.

The sight-line detection unit 260 includes a dichroic mirror 262, an image forming lens 263, a sight line detection sensor 264, a sight line detection circuit 265, and an infrared light-emission element 266 which follow and detects whether or not there is a sight line of a user and also detects movement or a position of the sight line.

The digital camera 100 of the present embodiment detects the sight line by the sight line detection unit 260 with a method called corneal reflection method. The corneal reflection method is a method of detecting a position and an orientation of the sight line from a positional relationship between a reflected light in which the infrared light emitted from the infrared light-emission element 266 is reflected by an eye ball (eye) 261 (especially the cornea) and the pupil of the eye ball (eye) 261. In addition, there are various methods for detecting the position and orientation of the sight line, such as a method called scleral reflection method, which utilizes the fact that the light reflectance in the iris is different from that in the white of the eye. Note that other sight line detection methods may be used as long as they can detect the position and orientation of the sight line.

The infrared light-emission element 266 is a diode for emitting an infrared light for detecting a sight-line position of a user in a finder screen, and irradiates the infrared light onto an eye ball (eye) 261 of a user toward the vicinity of the center of the eyepiece part 216. The infrared light irradiated from the infrared light-emission element 266 is reflected by the eye ball (eye) 261, and the reflected infrared light reaches the dichroic mirror 262. The dichroic mirror 262 has a function for reflecting on infrared light and allowing visible light to pass, and the reflected infrared light whose light path has been changed forms an image on an image capture plane of the sight line detection sensor 264 via the image forming lens 263.

The image forming lens 263 is an optical member that configures a sight line detection optical system. The sight line detection sensor 264 includes an image sensor that uses a CCD, CMOS, or the like. The sight line detection sensor 264 photo-electrically converts incident reflected infrared light into an electric signal, and outputs the electric signal to the sight line detection circuit 265. Based on the output signal from the sight line detection sensor 264, the sight line detection circuit 265 detects a sight-line position of a user from a position of a pupil or movement of the eye ball (eye) 261 of the user, and outputs detected information to the system control unit 201. The sight line detection sensor 264 can detect a pupil of an eye of a person, and thus, even if another object approaches or touches the eyepiece part 216, the sight line detection sensor 264 does not detect that a sight line of a person has been inputted. By this, the eyepiece part 216 has a function as a sight line operation unit, but the sight line detection unit may be another configuration.

The system control unit 201 is capable of determining the following states and operations with respect to the eyepiece part 216.

The sight line is not input to the eyepiece part 216/the sight line is newly input to the eyepiece part 216 (start of sight line input).

Being in the state of ongoing sight line input to the eyepiece part 216. Being in the state where a region of the eyepiece part 216 is being gazed at.

The sight line input to the eyepiece part 216 has been removed (end of sight line input).

Being in the state where no sight line is being input to the eyepiece part 216.

These operations/states and an input position of a sight line for the eyepiece part 216 are notified to the system control unit 201, and the system control unit 201 can determine what kind of operation (sight line operation) has been performed for the eyepiece part 216 based on the notified information.

Note that a gaze refers to a case where the sight line position of the user does not exceed a predetermined movement amount within a predetermined time. That is, the system control unit 201, based on the detection information received from the sight line detection circuit 265, when the time period in which the sight line of the user is fixed in a region exceeds a predetermined threshold, it is determined that the user is gazing at that area. Therefore, it can be said that the region is a gaze position (gaze region) which is a position where the gaze is performed. Note that "the sight line is fixed to a certain region" means, for example, that the average position of the movement of the sight line is within the region until a predetermined time period elapses, and the variation (variance) is less than a predetermined value.

<Setting of Locking Target Operation Member>

Figure 3:
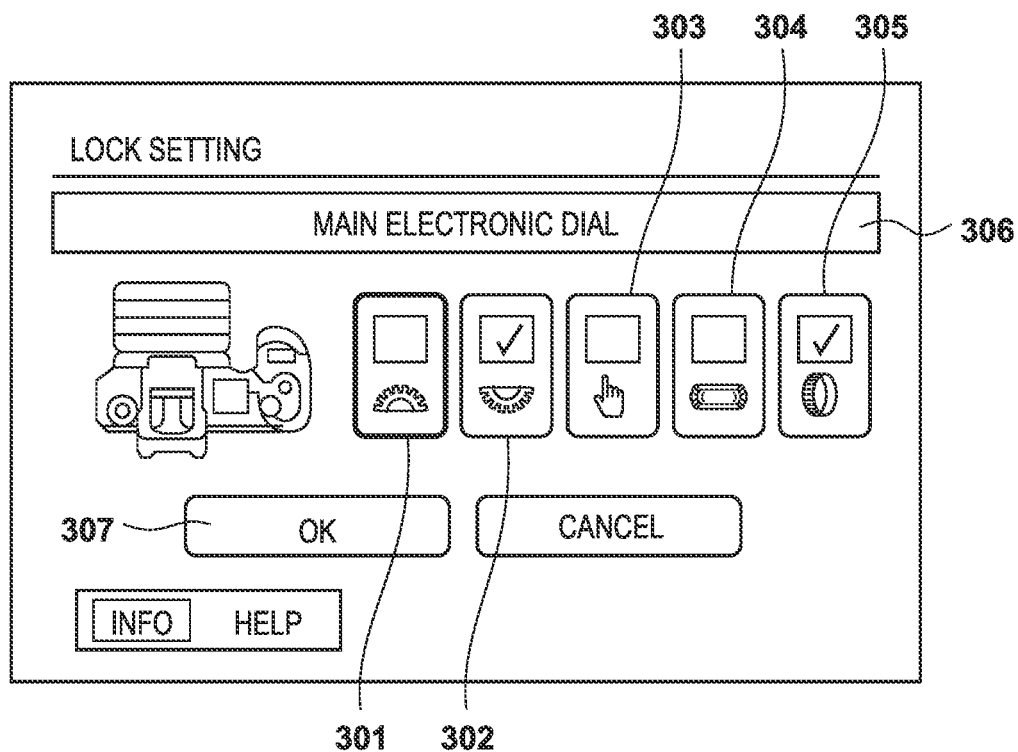
FIG. 3 is a diagram exemplifying a setting screen of an operation member subjected to be locked according to the present embodiment.

In the present embodiment, by pressing the lock button 110 it is possible to switch the locking target operation member to the locked state or the unlocked state. The locking target operation member can be set on a setting screen as shown in FIG. 3. As shown in the setting candidates 301 to 305 of FIG. 3, lockable operation members are displayed. In the setting candidates 301 to 305, operation members are displayed by icons, respectively. The name of the operation member in which the cursor is displayed is displayed in the region 306. As shown in the setting candidates 302 and 305 of FIG. 3, the check box can be checked and the locked state can be set by operating the OK button 307.

The setting candidate 301 indicates the main electronic dial 105, and is drawn by an icon indicated by an upwardly convex semicircle. The setting candidate 302 indicates the sub electronic dial 107, and is drawn by an icon indicated by a semicircle convex downward. The setting candidate 303 indicates the touch panel 270a and is drawn by an icon of the right index finger. The setting candidates 304 indicate the multi-controller 115, and are drawn by laterally long rectangular icons as shown in FIG. 1B. The setting candidate 305 indicates the control ring 271, and is drawn by an icon indicating that part of the cylindrical member is cut off and can be operated in the circumferential direction. In FIG. 3, a cursor is displayed in the selling candidate 301, and a main electronic dial is displayed in the region 306.

FIG. 3 exemplifies a case where the sub electronic dial 107 and the control ring 271 are set as locking target operation members.

FIG. 4 exemplifies setting items in which the selling change by the touch operation in the eye approaching state of the present embodiment is valid or invalid.

In the present embodiment, even if the locking target operation member is set to the locked state to prevent erroneous operation, the operation of the locking target operation member is temporarily switched to be valid because it is considered to be an intended operation by the user when the eye approaching state is detected. In the example of FIG. 4, even if the touch panel 270a is set to the locked state, the operation in the touch and drag AF performed in the eye approaching state is switched to be valid. More specifically, as shown in FIG. 4, even if the touch panel 270a is set to the locked state, the AF position (position of the AF frame/focus detection position/focus adjustment position) can be changed by the tap according to absolute position designation, but the other settings cannot be changed by the tap. On the other hand, the number of items that can be set by the touch-move (drag) in the relative position designation is larger than the number of items that can be set by the tap. The user can add restrictions based on the type of touch operation and restrictions based on the setting items on the setting screen that lists the setting items that validate or invalidate the setting change by the touch operation in the eye approaching state. For example, in the example shown in FIG. 4, the item that can be set by the tap that tends to cause an erroneous operation is set to the AF position only, so that the user can change the focus detection position by the tap while looking through the finder while preventing the change of the shooting parameter that is difficult to know the unintentional setting change. Further, in the example of FIG. 4, by setting the items that can be set by the touch-move, in which an erroneous operation is hard to occur, as shooting parameters that cannot be changed by a dial, a button, or the like, it is possible to change the setting by the touch-move while preventing an erroneous operation due to the tap. In this manner, the setting of the camera can be changed without changing on/off of the lock setting function for preventing an erroneous operation.

<Control Processing>

Next, With reference to FIGS. 5A and 5B, processing corresponding to various operations in the shooting mode of the present embodiment will be described.

Figure 5A:
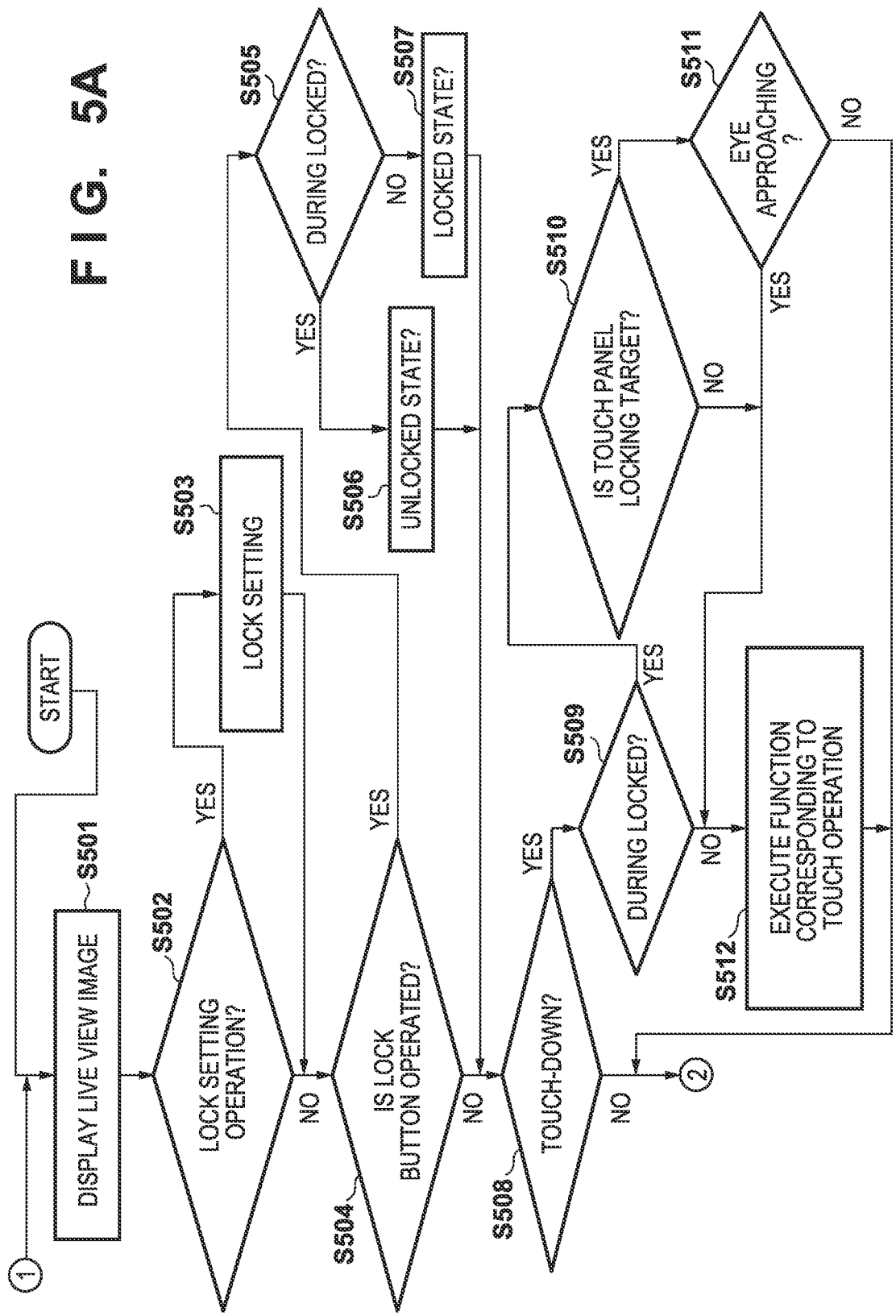
FIGS. 5A and 5B are flowcharts illustrating processing in accordance with various operations in a shooting mode of the present embodiment.
Figure 5B:
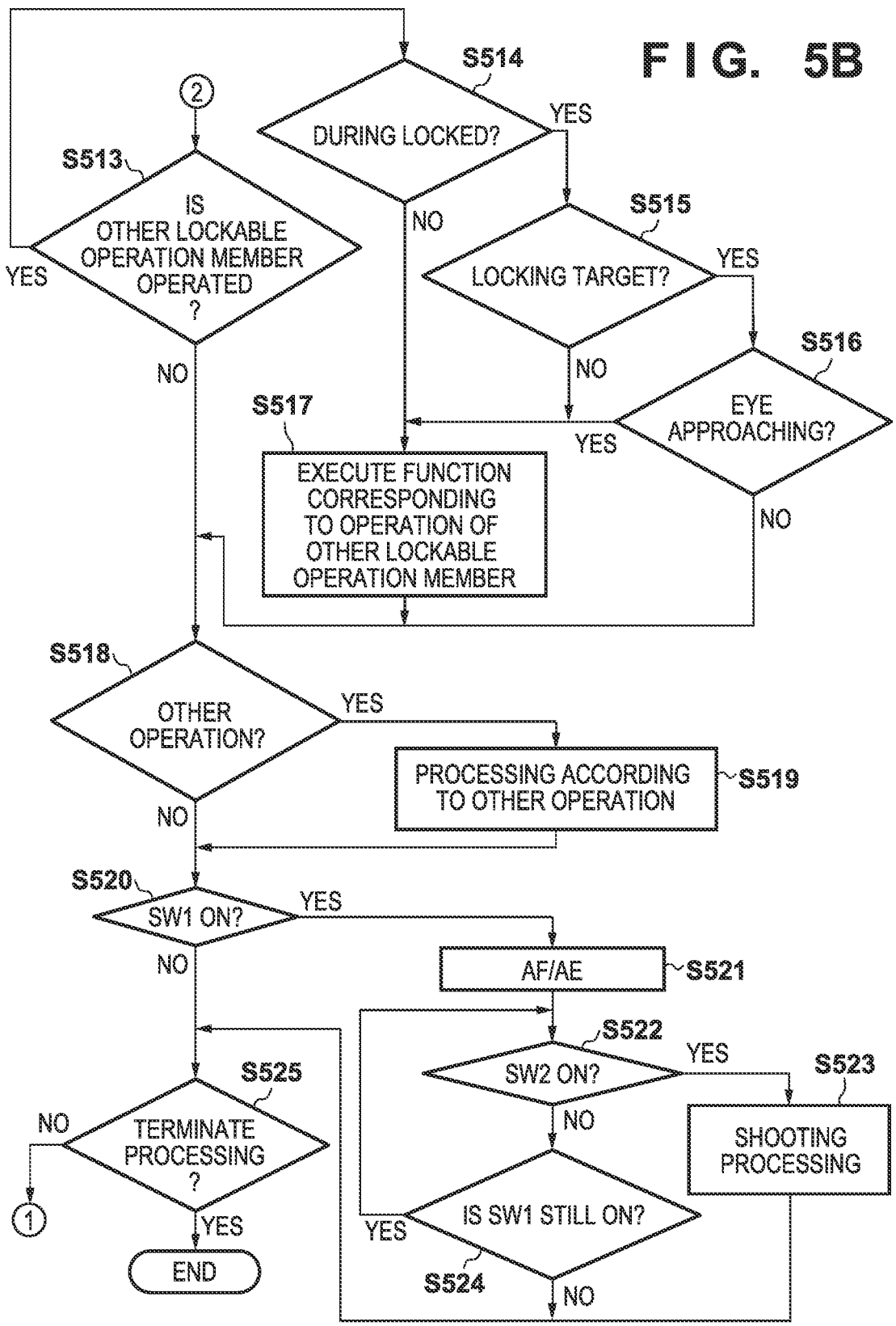

Note that the processing of FIGS. 5A and 5B are realized by expanding the programs stored in the nonvolatile memory 256 into the system memory 252, executing the programs by the system control unit 201, and controlling the respective components. Further, the processing of FIGS. 5A and 5B are started when the power of the digital camera 100 is turned on and the shooting mode is selected.

In step S501, the system control unit 201 displays a live view image (LV image, through the lens image) on the backside display unit 101 or the in-finder display unit 229 according to the detection result of the eye approach detection unit 217.

In step S502, the system control unit 201 determines whether or not the lock setting of the locking target operation member has been performed on the setting screen of FIG. 3 or the like. If it is determined that the lock setting has been performed, the processing proceeds to step S503, and otherwise, the processing proceeds to step S504.

In step S503, the system control unit 201 sets the locking target operation member whose lock setting has been performed in step S502 (check boxes have been checked in the setting screen of FIG. 3 or the like) as the locking target by the lock button 110.

In step S504, the system control unit 201 determines whether or not the lock button 110 is pressed. If it is determined that the lock button 110 is pressed, the processing proceeds to step S505, and otherwise, the processing proceeds to step S508.

In step S505, the system control unit 201 determines whether or not the current state is a state during locked (locked state) from a current state flag held in the system memory 252. When it is determined to be the state during locked, the processing proceeds to step S506, the system control unit 201 releases the lock setting so as to be an unlocked state (lock released state), and updates the state flag held in the system memory 252 to the information corresponding to the unlocked state. On the other hand, when it is determined not to be the state during locked, the processing proceeds to step S507, and the system control unit 201 sets the locking target to the locked state. Then, the state flag held in the system memory 252 is updated to information corresponding to the locked state.

In step S508, the system control unit 201 determines whether or not the touch-down has been performed on the touch panel 270a of the backside display unit 101. If it is determined that the touch-down has been performed, the processing proceeds to step S509, and otherwise, the processing proceeds to step S513.

In step S509, the system control unit 201 determines whether or not the current state is the locked state in the same manner as in step S505, and proceeds to step S510 when it is determined that the current state is the locked state, the processing proceeds to step S510, and otherwise (in the case of the unlocked state), the processing proceeds to step S512.

In step S510, the system control unit 201 determines whether or not the touch panel 270a is a locking target operation member set in step S503. If it is determined that the touch panel 270a is the locking target operation member, the processing proceeds to step S511, and otherwise, the processing proceeds to step S512.

In step S511, the system control unit 201 determines whether or not the eyepiece part 216 is in the eye approaching state based on the detection result of the eye approach detection unit 217. If it is determined to be in the eye approaching state, the processing proceeds to step S512, and otherwise, the processing proceeds to step S513. Here, the system control unit 201 sets the eye approach detection unit 217 to be off in response that the eye approach detection unit 217 has detected the eye approaching state or is in the state during detection, if the sight line detection unit 260 is turned on and is detecting the sight line, it is determined to be in the eye approaching state, the system control unit 201 executes the function in response to the touch operation in step S512. In this manner, even when the touch panel 270a is set to the locked state as the locking target operation member, the locked state is temporarily released because it is considered to be the intentional touch operation if the eyepiece part 216 is in the eye approaching state or the sight line detection unit 260 is in the state where the sight line detection unit 260 is detecting the sight line, and the processing corresponding to the touch operation is executed. Thus, even when the state is set to the locked state, the user can set the AF frame by the tap in the eye approaching state or set the AF frame by the touch-move. Further, the user can perform other setting operations shown in FIG. 4. That is, the operability at the time of performing the touch and drag in the eye approaching state can be improved. Note that even when the system control unit 201 determines the state during the eye approaching in step S511 and executes the function corresponding to the touch operation in step S512, it may be controlled so as to invalidate part of the touch operations. For example, the setting of the item shown in FIG. 4 becomes possible as the item to be set by the touch operation, but the setting change by the touch-move is accepted (the setting change is validated) for the setting other than the AF position, but the setting change by the tap is not accepted (the invalidation of the setting change is maintained).

In step S512, the system control unit 201 executes a function corresponding to a touch operation as exemplified below.

For example, when the touch operation is the touch-down operation, if the touch operation is performed in a non-eye approaching state and the touch panel 270a is not the locked state (NO in step S509 or NO in step S510), the operated position is set to the AF position. In addition, even in the locked state, if the touch-down is made in the eye approaching state (Yes in step S511), the AF position is set to the corresponding position if the position designation method is the absolute position designation (the AF position is not changed by only the touch-down in the relative position designation).

For example, when the touch operation is the touch-move, if the touch-move is made in the non-eye approaching state and in the state where the touch panel 270a is not the locked state (NO in step S509 or NO in step S510), the AF position is changed in accordance with the movement of the touch position. In addition, even in the locked state, if the touch-move is made in the eye approaching state (Yes in step S511), the AF position moves in accordance with the movement of the touch position.

In step S513, the system control unit 201 determines whether or not other locking target operation member has been operated. If it is determined that other locking target operation member has been operated, the processing proceeds to step S514, and otherwise, the processing proceeds to step S518.

In step S514, the system control unit 201 determines whether or not the current state is the locked state in the same manner as in step S505, if it is determined that the current state is the locked state, the processing proceeds to step S515, and otherwise, the processing proceeds to step S517.

In step S515, the system control unit 201 determines whether or not the operated other locking target operation member is the locking target operation member set in step S503. If it is determined that the operated other locking target operation member is the locking target operation member set in step S503, the processing proceeds to step S516, and otherwise, the processing proceeds to step S517.

In step S516, the system control unit 201 determines whether or not the eyepiece part 216 is in the eye approaching state based on the detection result of the eye approach detection unit 217 in the same manner as in step S511, If it is determined that the eyepiece part 216 is in the eye approaching state, the processing proceeds to step S517, and otherwise, the processing proceeds to step S518.

In step S517, the system control unit 201 executes a function corresponding to the operation of other locking target operation member other than the touch panel as exemplified below.

For example, when other locking target operation member is the main electronic dial 105, even if the main electronic dial 105 is rotated in the locked state (YES in step S515) and the eyepiece part 216 is in the non-eye approaching state (NO in step S516), the shooting parameter is not changed. On the other hand, even when the main electronic dial 105 is in the locked state (YES in step S515), if the eyepiece part 216 is in the eye approaching state (YES in step S516), the shooting parameter is changed in response to the main electronic dial 105 being rotated.

Note that the shooting parameter includes at least one of an aperture value, a shutter speed, an ISO sensitivity and an exposure correction.

In step S518, the system control unit 201 determines whether or not other operation has been performed. If it is determined that other operation has been performed, the processing proceeds to step S519, and otherwise, the processing proceeds to step S520.

In step S519, the system control unit 201 executes processing corresponding to other operation.

For example, when an operation is performed on a different operation member from the locking target operation member, a function corresponding to the operation member is executed regardless of whether or not the different operation member is in the locked state and whether or not the eyepiece part 216 is in the eye approaching state. For example, in response to the SET button 109 being pressed, the quick setting screen is displayed regardless of whether or not the button is in the locked state and whether or not the eyepiece part 216 is in the eye approaching state. The quick setting screen (function screen) is a screen in which a plurality of setting icons are displayed together with a live view image. The plurality of setting icons displayed on the quick setting screen include, for example, setting icons corresponding to setting items such as switching of the AF target selection mode, image quality setting, and setting of filtering by image processing. The setting of the corresponding setting item can be changed by selecting and operating the selling icon.

In step S520, the system control unit 201 determines whether or not the shooting preparation instruction is input, that is, whether the first shutter switch signal SW1 is turned on by the shutter-release button 102 being pressed halfway. If it is determined that the shooting preparation instruction is input, the processing proceeds to step S521, and otherwise, the processing proceeds to step S525.

In step S521, the system control unit 201 executes the AF processing and the AE processing.

In step S522, the system control unit 201 determines whether or not the shooting instruction is input, that is, whether the second shutter switch signal SW2 is turned on by the shutter-release button 102 being fully pressed. If it is determined that the shooting instruction is input, the processing proceeds to step S523, and otherwise, the processing proceeds to step S524.

In step S523, the system control unit 201 performs a series of shooting processing until an image is captured by the image capturing unit 222 and the captured image is recorded in the recording medium 250 as an image file.

In step S524, the system control unit 201 determines whether or not the system is in a state where the shooting preparation instruction is still being input, that is, whether the first shutter switch signal SW1 is still kept to be on while the shutter-release button 102 is pressed halfway. If it is determined that the system is in a state where the shooting preparation instruction is still being input, the processing returns to step S522, and otherwise, the processing proceeds to step S525.

In step S525, the system control unit 201 determines whether or not the shooting mode processing is to be terminated. The shooting mode processing is terminated by switching to the reproduction mode, turning off the power of the digital camera 100, and the like. If it is determined that the shooting mode processing is to be terminated, the system control unit 201 ends the shooting mode processing, and otherwise, the processing returns to step S501.

According to the present embodiment, even if the locking target operation member set as the locking target is operated in the non-eye approaching state, the processing corresponding to the operation is not executed, and when the operation is performed in a state where a predetermined condition including the eye approaching state is satisfied, the processing corresponding to the operation is executed. By controlling such way, it is possible to reduce the trouble of the operation when setting and releasing the lock of the locking target operation member, and achieving both prevention of erroneous operation and good operability.

Note that the touch and drag function may be prioritized to improve operability, and the other functions may be prioritized to prevent erroneous operation in the locked state. That is, when the eye approaching state is detected in step S511 (YES in step S511), the function corresponding to the touch operation is executed (step S512) even in the locked state, but the operation may be invalidated without executing the processing of step S516, That is, among the plurality of locking target operation members, the operation member (for example, the main electronic dial 105 set as the locking target operation member) which is not the touch operation member may be invalidated even in the eye approaching state if the operation member is in the locked state (the execution of the function according to the rotation operation of the main electronic dial 105 is restricted).

Note that the foregoing various control described as something that the system control unit 201 performs may be performed by one piece of hardware, and a plurality of pieces of hardware (for example, a plurality of processors and/or circuits) may distribute processing to perform control of the entirety of the apparatus.

In addition, although the present invention was explained in detail based on suitable embodiments, the present invention is not limited to these specific embodiments, and various forms of a scope that does not deviate from the gist of this invention are included in the invention. Furthermore, the above-described embodiment is merely one embodiment of the present invention, and different embodiments can be combined as appropriate.

The foregoing embodiment describes an example of a case where the present invention is applied in a single reflex digital camera. However, the present invention is not limited to this example. The present invention can be applied to an apparatus having a function of lock setting/releasing of the locking target operation member and detecting whether or not the eyepiece part 216 is in an eye approaching state. That is, the present invention can be applied in personal computers, PDAs, mobile phone terminals, smart phones which are the types of the mobile phone terminals, tablet terminals, portable image viewers, digital photo frames, music players, game devices, e-book readers or other household apparatuses, vehicle-mounted apparatuses, medical equipment, electronic binoculars, or the like, which can perform shooting by attaching an external finder.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No, 2020-053139, filed Mar. 24, 2020 which is hereby incorporated by reference herein in its entirety.

What is claimed is:

1. An image capture apparatus comprising:
an eye approach detection unit configured to detect an eye approaching to a finder;
a backside touch panel in which an operation surface is provided with a display surface of a display unit which is capable of displaying a captured image and which is provided on a backside of the image capture apparatus where the finder is provided;
a switching unit configured to switch between a locked state in which execution of a function corresponding to an operation on the backside touch panel is restricted and an unlocked state in which the execution of the function is not restricted according to an operation on an operation unit by a user; and
a control unit configured to perform control such that in the locked state,
even if a specific operation is performed on the backside touch panel without detecting the eye approaching by the eye approach detection unit, predetermined processing corresponding to the specific operation is not executed, and the predetermined processing is executed in response to the specific operation on the backside touch panel being performed in a state where a predetermined condition including detection of the eye approaching by the eye approach detection unit is satisfied.

2. The apparatus according to claim 1, wherein in the unlocked state, even if the specific operation is performed on the backside touch panel without detecting the eye approaching by the eye approach detection unit, the control unit executes the predetermined processing according to the specific operation.

3. The apparatus according to claim 1, wherein the specific operation is a start of a touch and/or a movement of a touch position while touching.

4. The apparatus according to claim 1, wherein in the locked state, for a plurality of operation members including the backside touch panel and other operation members, the execution of the function corresponding to the operation is restricted, in the locked state and in a state where the predetermined condition is satisfied, the control unit performs control such that the predetermined processing is executed in accordance with the specific operation on the backside touch panel, and an execution of a function corresponding to an operation on the other operation member is restricted.

5. The apparatus according to claim 1, wherein the predetermined processing is a determination of a focus adjustment position or a position of a tracking target.

6. The apparatus according to claim 1, wherein the predetermined processing is a change of a specific shooting parameter.

7. The apparatus according to claim 6, wherein the specific shooting parameter is one of aperture setting, shutter speed, ISO sensitivity and exposure correction.

8. The apparatus according to claim 1, further comprising a sight line detection unit configured to detect a sight line by an eye contacting with the finder, wherein the predetermined condition includes that the sight line detection unit is detecting a sight line of a user.

9. A method of controlling an image capture apparatus having an eye approach detection unit configured to detect an eye approaching to a finder, a backside touch panel in which an operation surface is provided with a display surface of a display unit which is capable of displaying a captured image and which is provided on a backside of the image capture apparatus where the finder is provided, and a switching unit configured to switch between a locked state in which execution of a function corresponding to an operation on the backside touch panel is restricted and an unlocked state in which the execution of the function is not restricted according to an operation on an operation unit by a user, the method comprising:

controlling such that, in the locked state, even if a specific operation is performed on the backside touch panel without detecting the eye approaching by the eye approach detection unit, predetermined processing corresponding to the specific operation is not executed, and the predetermined processing is executed in response to the specific operation on the backside touch panel being performed in a state where a predetermined condition including detection of the eye approaching by the eye approach detection unit is satisfied.

10. The method according to claim 9, wherein in the unlocked state, in the controlling, even if a specific operation is performed on the backside touch panel without detecting the eye approaching by the eye approach detection unit, predetermined processing corresponding to the specific operation is executed.

11. The method according to claim 9, wherein the specific operation is a start of a touch and/or a movement of a touch position while touching.

12. The method according to claim 9, wherein in the locked state, for a plurality of operation members including the backside touch panel and other operation members, the execution of the function corresponding to the operation is restricted, in the controlling, in the locked state and in a state where the predetermined condition is satisfied, the predetermined processing is performed in accordance with the specific operation on the backside touch panel, and an execution of a function corresponding to an operation on the other operation member is restricted.

13. The method according to claim 9, wherein the predetermined processing is a determination of a focus adjustment position or a position of a tracking target.

14. The method according to claim 9, wherein the predetermined processing is a change of a specific shooting parameter.

15. The method according to claim 14, wherein the specific shooting parameter is one of aperture setting, shutter speed, ISO sensitivity and exposure correction.

16. The method according to claim 9, wherein the image capture apparatus further includes a sight line detection unit configured to detect a sight line by an eye contacting with the finder, the predetermined condition includes that the sight line detection unit detects a sight line.

17. A non-transitory computer-readable storage medium storing a program for causing a computer to function as each unit of an image capture apparatus comprising:

an eye approach detection unit configured to detect an eye approaching to a finder;

a backside touch panel in which an operation surface is provided with a display surface of a display unit which is capable of displaying a captured image and which is provided on a backside of the image capture apparatus where the finder is provided;

a switching unit configured to switch between a locked state in which execution of a function corresponding to an operation on the backside touch panel is restricted and an unlocked state in which the execution of the function is not restricted according to an operation on an operation unit by a user; and a control unit configured to perform control such that in the locked state, even if a specific operation is performed on the backside touch panel without detecting the eye approaching by the eye approach detection unit, predetermined processing corresponding to the specific operation is not executed, the predetermined processing is executed in response to the specific operation on the backside touch panel being performed in a state where a predetermined condition including detection of the eye approaching by the eye approach detection unit is satisfied.

18. A non-transitory computer-readable storage medium storing a program for causing a computer to execute a method of controlling an image capture apparatus having an eye approach detection unit configured to detect an eye approaching to a finder, a backside touch panel in which an operation surface is provided with a display surface of a display unit which is capable of displaying a captured image and which is provided on a backside of the image capture apparatus where the finder is provided, and a switching unit configured to switch between a locked state in which execution of a function corresponding to an operation on the backside touch panel is restricted and an unlocked state in which the execution of the function is not restricted according to an operation on an operation unit by a user, the method comprising:

controlling such that, in the locked state, even if a specific operation is performed on the backside touch panel without detecting the eye approaching by the eye approach detection unit, predetermined processing corresponding to the specific operation is not executed, and the predetermined processing is executed in response to the specific operation on the backside touch panel being performed in a state where a predetermined condition including detection of the eye approaching by the eye approach detection unit is satisfied.

* * * * *